Mar. 6, 1923.
G. H. LITTLE
1,447,877
SUPPORT FOR PNEUMATIC TOOLS
Filed Feb. 4, 1921
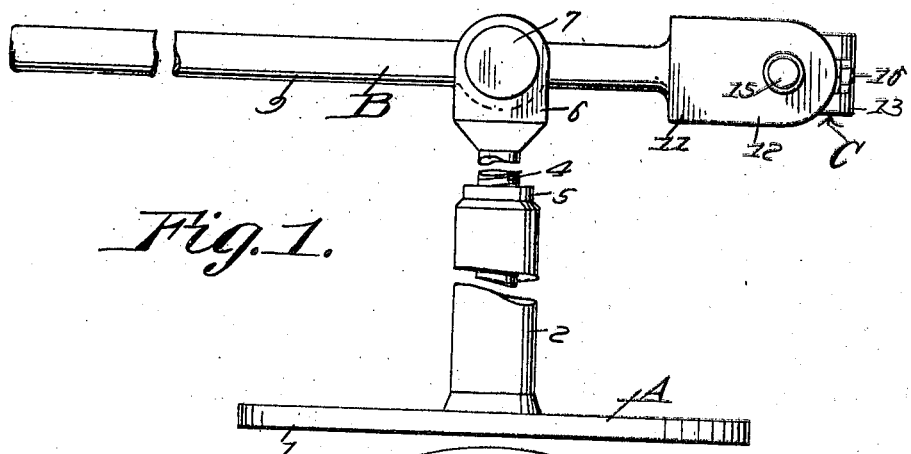
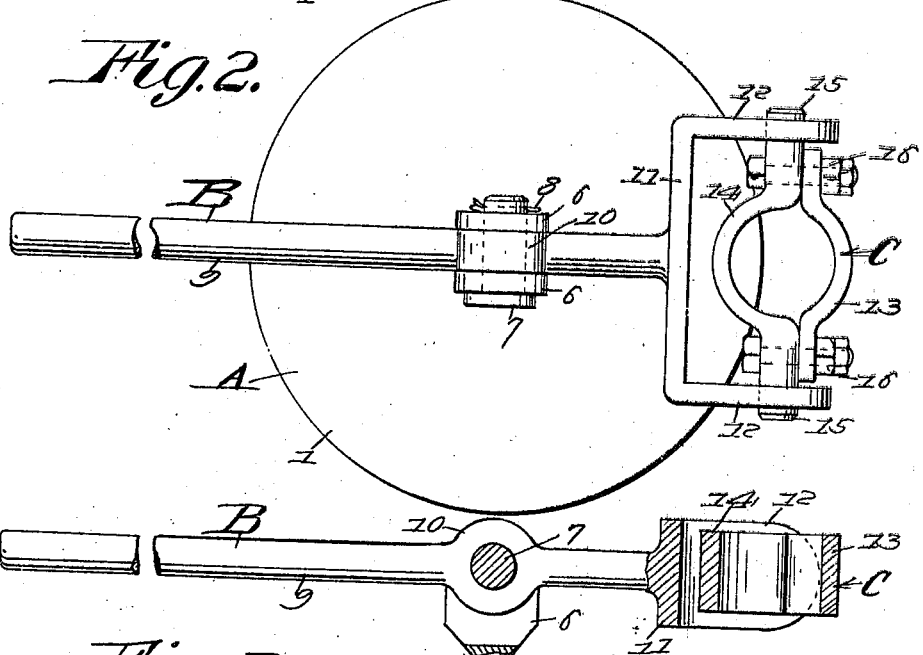
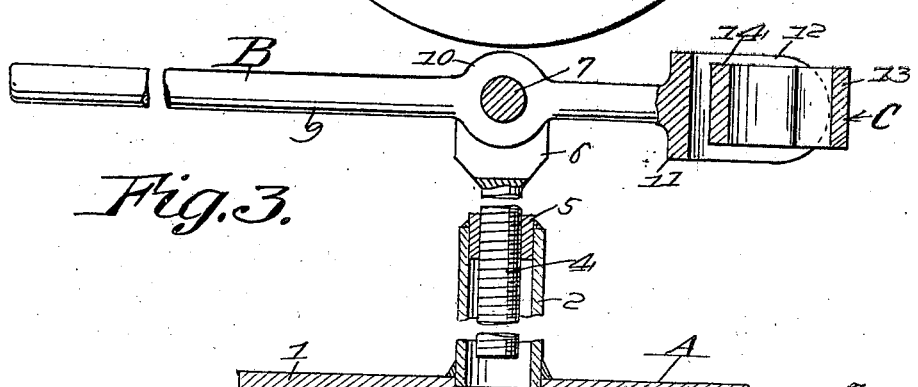

Patented Mar. 6, 1923.

1,447,877

UNITED STATES PATENT OFFICE.

GEORGE H. LITTLE, OF CUMBERLAND, MARYLAND.

SUPPORT FOR PNEUMATIC TOOLS.

Application filed February 4, 1921. Serial No. 442,538.

*To all whom it may concern:*

Be it known that I, GEORGE H. LITTLE, a citizen of the United States of America, residing at Cumberland, in the county of Allegany and State of Maryland, have invented new and useful Improvements in Supports for Pneumatic Tools, of which the following is a specification.

The purpose of the invention is to provide a device in which the pneumatic tool may be placed and held as desired to the work, thus relieving the arms and body of the vibrations subject to the operation of such a tool. With this end in view the invention consists in the combination of a main supporting element, a support for the tool proper, and an arm carried by the main supporting element and carrying the tool support, the latter being angularly movable with reference to the arm and the arm angularly movable with reference to the main support.

The invention is illustrated and described in a specific embodiment, to which, however, it is not to be restricted. The right is reserved to make such changes or alterations as the actual reduction to practice may suggest, in so far as such changes or alterations are compatible in spirit with the annexed claims.

In the accompanying drawing:

Figure 1 is a side elevational view of the invention.

Figure 2 is a top plan view.

Figure 3 is a sectional view taken on the vertical plane of the axis of the main support.

The invention consists of the main support A, the tool arm B and the tool holder C, the holder being carried by the arm, as shown, and the arm in turn carried by the main support. The main support comprises a foot plate 1 made preferably round and upstanding from the center of this foot plate there is a column 2 which in consideration of cheap construction is made preferably of a piece of pipe or tubing, set in the top face of the foot plate and welded to the latter, preferably by the oxyacetylene process. The column is designed as the support for the tool post, which is formed with a threaded shank 4 to provide for vertical adjustment of the tool post with reference to the column, the latter having set in its upper end the nut 5 which is welded to the column and which receives the shank 4 of the post. The post at the upper end is forked, as shown, and the two spaced arms 6 thus provided support the headed stud 7 which spans them, the latter being drilled transversely at the end remote from the head to receive the cotter pin 8.

The stud 7 serves as the pivotal support for the arm B, the shank 9 of which is enlarged at an intermediate point, as indicated at 10, this enlarged portion surrounding an eye through which the stud 7 loosely passes. The shank at one end carries the yoke 11, the spaced arms 12 of which serve as the support for the tool holder C. The extension of the shank to the other side of the enlargement 10 serves as a handle by means of which the shank and thus the arm may be rocked to elevate or depress the yoke. The tool holder C comprises the complemental clamping elements 13 and 14, of which the latter is formed with journals 15 engaging appropriate eyes formed in the arms 12 of the yoke. The two members are secured together by bolts 16.

In attaching a pneumatic tool to the support, the clamping members 13 and 14 are disengaged and the tool shank or body is placed between them, after which the bolts are tightened and the tool becomes rigidly secured in the tool holder and is permitted to swing in a vertical plane, so as to move the tool proper toward or away from the foot plate 1 of the main support. The tool may be raised or lowered with reference to the work by depressing or raising the handle end of the shank 9 and the movement of the tool in virtue of the manner in which the holder is supported in the arm and in virtue of the manner in which the arm is carried in the main support will effect this placement in any position desired with respect to the work.

Having described the invention what is claimed as new and useful is:—

1. A device for the purpose indicated comprising a main support consisting of a foot plate and a tubular column upstanding therefrom, a tool post having a shank threadingly engaged with and telescoping in said column and formed with a bifurcated upper end, a stud spanning the arms of said bifurcated end, a tool arm swingingly mounted on said stud and projecting to either side thereof, and a tool holder pivotally mounted at one end of said arm.

2. A device for the purpose indicated comprising a main support, a tool arm pivotally mounted at the upper end of said support and having a yoke at one extremity, and a tool holder consisting of complemental clamping members one of which is formed with journals engaging bearing eyes formed in opposite arms of said yoke, the tool holder having bolts by which said clamping members are releasably secured together.

In testimony whereof I affix my signature.

GEORGE H. LITTLE.